E. V. LOUSTALOT.
BED FOR USE ON AUTOMOBILES.
APPLICATION FILED OCT 10, 1921.
1,421,268.
Patented June 27, 1922.
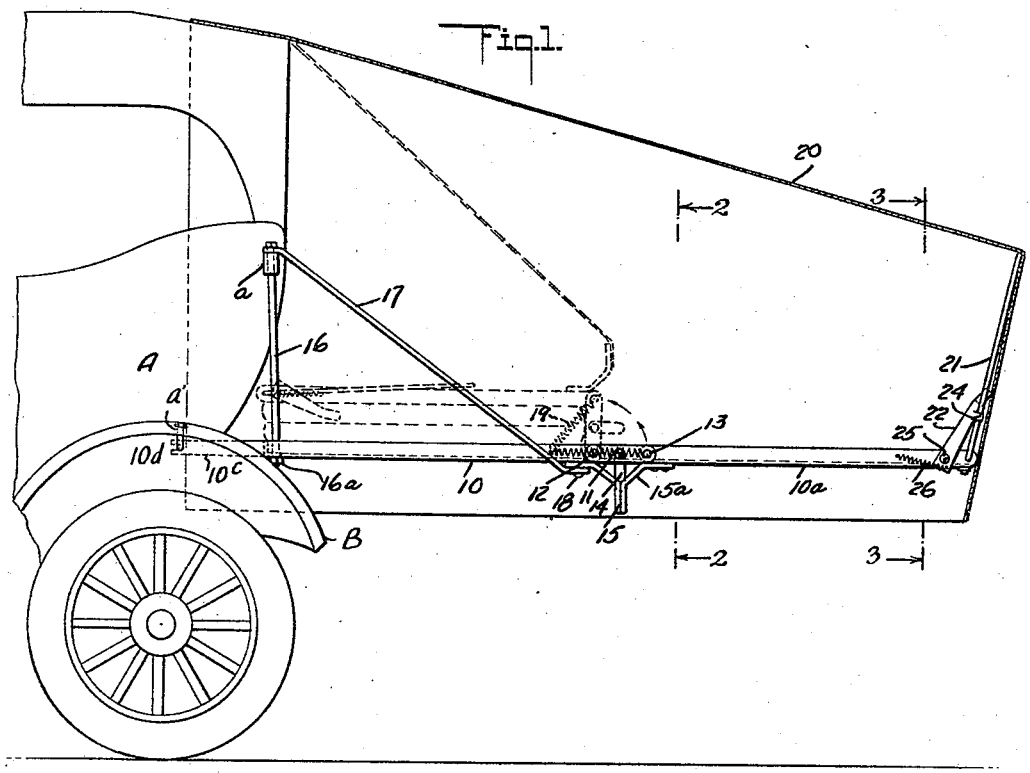
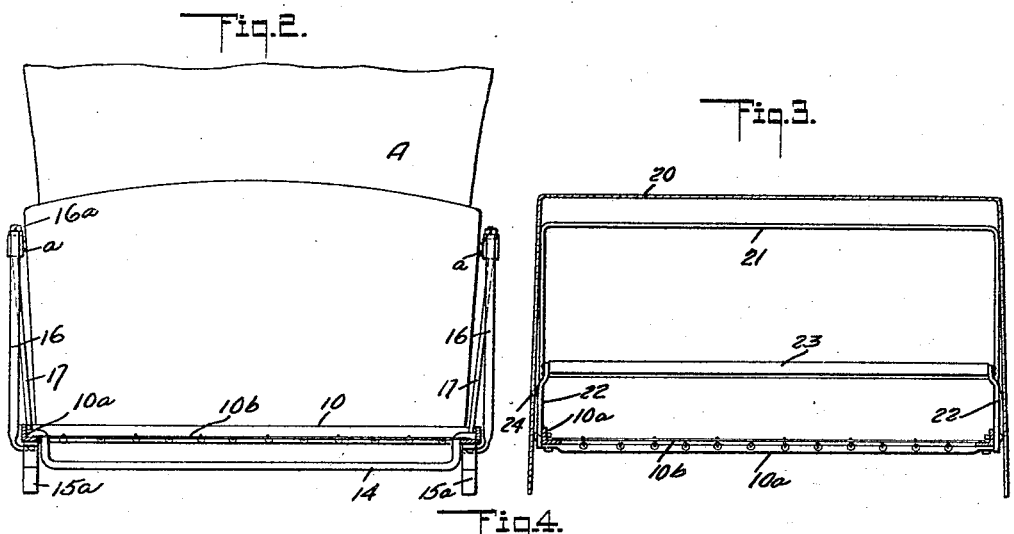
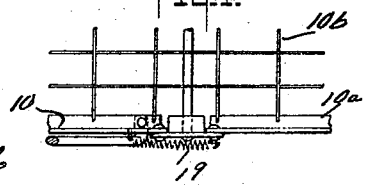
WITNESSES
INVENTOR
EDWARD V. LOUSTALOT
BY
ATTORNEYS

UNITED STATES PATENT OFFICE.

EDWARD VINCENT LOUSTALOT, OF FRANKLIN, LOUISIANA.

BED FOR USE ON AUTOMOBILES.

1,421,268.  Specification of Letters Patent.  Patented June 27, 1922.

Application filed October 10, 1921. Serial No. 506,775.

*To all whom it may concern:*

Be it known that I, EDWARD V. LOUSTALOT, a citizen of the United States, and a resident of Franklin, in the parish of St. Mary and State of Louisiana, have invented a new and Improved Bed for Use on Automobiles, of which the following is a description.

My invention relates to a bed adapted for use on an automobile at the back and the invention has for its general object to provide a bed having suspension means at an end thereof adapted for connection with the body of the automobile and so formed and arranged that the suspension means may be made to dispose the mattress frame suspended on the vehicle as a cantilever possessing the necessary strength to maintain its form and sustain the necessary weight to be imposed thereon when held by the end suspension.

The invention more specifically has for a purpose to provide a bed having a mattress frame formed of head and foot sections pivotally connected for one to fold onto the other and provided with elements thereon at the under side adapted for coengagement to truss the frame at the joint.

Other objects of the invention and its distinctive features and advantages will clearly appear as the description proceeds.

Reference is to be had to the accompanying drawings forming a part of this specification, it being understood that the drawings are merely illustrative of one example of the invention.

Figure 1 is a side elevation of a bed embodying my invention showing the same set up for use on an automobile illustrated in part, the bed canopy being shown in longitudinal vertical section;

Figure 2 is a cross section on the line 2—2, Figure 1;

Figure 3 is a cross section on the line 3—3, Figure 1;

Figure 4 is a detail in plan view at the joint of one of the side rails of the mattress frame.

In carrying out my invention in accordance with the illustrated example, a mattress frame is provided, consisting of a head section 10 and a foot section $10^a$. Said sections are pivotally connected advantageously through the medium of connecting links 11 pivoted at their front ends as at 12 to the rear ends of the side rails of the head section 10 and pivoted at their rear ends as at 13 to the front ends of the side rails of the foot section $10^a$, the arrangement permitting the foot section $10^a$ to fold over onto the head section as indicated in dotted lines, Figure 1.

The foot section $10^a$ has a tie rod or girt 14 extending transversely between the links 11. In order to brace the pivotally connected head and foot sections, I provide brace elements in the form of brackets 15, $15^a$ on the respective sections adjacent to the pivots, said brackets having depending terminals adapted to come into contact, when the foot section is lowered, the bracket jointly serving to truss the side rails at the joint.

Suspension means is provided which is of such a character as to permit of the bed being secured to the vehicle body in a manner to dispose the mattress frame suspended in the form of a cantilever. The suspension means serves to sustain the frame even without the foot being supported by legs, or the like. In the illustrated example upstanding members 16 which may as shown consist of bolts having nuts $16^a$, said bolts at their upper ends being adapted to be passed vertically through the eyes or lugs $a$ provided usually on an automobile body (A) for sustaining the top props. Engaging the bolts 16 at their upper ends are tension rods 17 extending obliquely downwardly to the mattress frame and here shown as secured by rivets 18 by which the brackets 15 are secured to the head section 10.

In addition to the suspension elements 16 and tension rods 17 I provide for securing the front end of the mattress 10 at the head to the automobile body in the plane of said mattress frame or approximately so, for which purpose in the illustrated example, extensions $10^c$ project forwardly from the front end of the head section of the frame at the sides, beyond the suspension elements 16, the forward ends of said extensions having notches $10^d$ whereby the said extensions will be received on the usual holding elements $a'$ which are employed to secure the mud-guard B of the vehicle.

A coil spring 19 may be provided secured respectively to the head section 10 and foot section $10^a$ adjacent to the pivots so as to be dead-centered when the foot section is lowered and adapted to exert its tension on the foot section when the later is folded onto the head section as indicated in dotted lines, Figure 1.

Provision is made for sustaining a canopy 20, the front end of which may overlap the body of the vehicle. At the rear end the foot section 10ª has means to support said canopy, said supporting means in the illustrated example consisting of a transverse arched frame 21 secured to the side rails of the foot section. Braces 22 are provided connected by a cross bar 23 and adapted to engage the frame 21, said braces having lugs 24 to assist in insuring the engagement of the braces with the arched frame, the braces being pivoted adjacent to their lower ends as at 25 to the side rails of the foot section 10ª and being subject to coil springs 26 secured to the braces 22 below their pivots and secured at their opposite ends to the side rails 10ª.

The mattress frame has a mattress support here shown as in the form of a woven wire mattress 10ᵇ.

I would state in conclusion that while the illustrated example constitutes a practical embodiment of my invention, I do not limit myself strictly to the exact details herein illustrated, since, manifestly, the same can be considerably varied without departing from the spirit of the invention as defined in the appended claims.

Having thus described my invention, I claim:

1. A bed of the class described including a mattress frame comprising a head and a foot section, and suspension means on the frame at the head adapted for connection with a vehicle at a height to sustain the frame raised free from the ground, the foot section having support on the head section, said support and said head section serving to constrain the two sections to maintain their elevated positions in the same plane, and a spring between the two sections for holding in place the foot section when folded on the head section.

2. A bed of the class described including a mattress frame, formed of head and foot sections pivotally connected for one to fold over onto the other, and suspension means appurtenant to said head section and including uprights rising therefrom above the plane of the frame thereof, and oblique tension elements secured to the upper ends of said uprights and to the sides of the frame rearwardly of the uprights, said suspension means adapted at its upper end to effect a suspending connection with a vehicle.

3. A bed of the class described including a mattress frame trussedly suspended from the body of a vehicle, said frame comprising a head and a foot section pivotally connected for one to fold on the other, a spacing link between the sections, and bracing elements affixed to each section adjacent said link adapted to engage each other and truss these sections at their pivot points below said link when the sections are unfolded.

4. A bed of the class described including a mattress frame comprising head and foot sections, pivotally connected for one to fold onto the other, a link pivotally connected with the adjacent ends of the sections and brace brackets rigid with each section adjacent to said link and adapted to engage each other when the sections are alined to thereby truss the joint between the sections.

5. A bed of the class described including a mattress frame which comprises a head and a foot section, upstanding supporting elements at the head of the frame extending a substantial distance above the same and detachably secured at their upper end to the body of the vehicle, and tension elements extending obliquely downward from said upstanding elements to a connection with said frame adjacent the foot section.

6. A bed of the class described, including a mattress frame, comprising side bars, said side bars terminating in bifurcations at one end, clamping brackets secured to the vehicle body to receive said bifurcated ends, and upstanding elements on said side members adjacent the bifurcated ends adapted to be secured at their upper ends to the vehicle body.

7. A bed of the class described including a foldable mattress frame, upstanding elements on the said frame at the head adapted to be secured at their upper ends to a vehicle, said frame being adapted to have support on the vehicle below the connection of said elements with the vehicle in line with the frame, and oblique tension elements extending from the said upstanding elements near their upper ends to a connection with the mattress frame adjacent the center of the same.

EDWARD VINCENT LOUSTALOT.